US007181500B2

(12) United States Patent
Jen et al.

(10) Patent No.: US 7,181,500 B2
(45) Date of Patent: Feb. 20, 2007

(54) SYSTEM AND METHOD FOR UTILIZING PERSONAL INFORMATION TO CUSTOMIZE AN APPLICATION PROGRAM

(75) Inventors: James H. Jen, Kirkland, WA (US); Jason J. Weber, Kirkland, WA (US); Michael C. Connolly, Seattle, WA (US); Todd G. Roshak, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 683 days.

(21) Appl. No.: 09/883,585

(22) Filed: Jun. 18, 2001

(65) Prior Publication Data
US 2002/0194297 A1    Dec. 19, 2002

(51) Int. Cl.
*G06F 15/16* (2006.01)
(52) U.S. Cl. ............... 709/217; 709/203; 709/223; 707/3; 707/9; 707/10; 715/507; 715/508
(58) Field of Classification Search ............... 709/203, 709/219–221, 223–224, 229, 226, 217, 245, 709/246; 705/1, 14, 51; 713/166, 1, 2, 201; 707/9, 3, 8, 10, 101; 717/134, 47, 171–172, 717/174, 176, 121; 715/507–509, 734, 737–739, 715/745–747
See application file for complete search history.

(56) References Cited

U.S. PATENT DOCUMENTS

| | | | |
|---|---|---|---|
| 6,145,086 A * | 11/2000 | Bellemore et al. ........... | 713/202 |
| 6,151,600 A * | 11/2000 | Dedrick ........................ | 707/10 |
| 6,317,783 B1 * | 11/2001 | Freishtat et al. ............. | 709/218 |
| 6,339,826 B2 * | 1/2002 | Hayes et al. .................. | 713/166 |
| 6,347,331 B1 * | 2/2002 | Dutcher et al. ............... | 709/203 |
| 6,823,376 B1 * | 11/2004 | George et al. ............... | 709/221 |
| 6,862,612 B1 * | 3/2005 | Horn et al. ................... | 709/219 |
| 6,868,448 B1 * | 3/2005 | Gupta et al. ................. | 709/226 |
| 6,917,958 B1 * | 7/2005 | Howe et al. .................. | 709/203 |
| 2002/0032763 A1 * | 3/2002 | Cox et al. ..................... | 709/223 |
| 2002/0144144 A1 * | 10/2002 | Weiss et al. ................. | 713/201 |
| 2002/0161766 A1 * | 10/2002 | Lawson et al. ................ | 707/9 |

(Continued)

*Primary Examiner*—ThuHa Nguyen
(74) *Attorney, Agent, or Firm*—Ronald M. Anderson

(57) ABSTRACT

A framework identity database for receiving, storing, and sharing a user's personal information. The framework identity database operates in conjunction with a user interface and one or more associated application programs to receive a user's personal information. The user interface sends personal information to the framework identity database. New or previously stored personal information can also be sent to the framework identity database from one or more application programs or input devices associated with a computer or a network. The framework identity database creates and stores a user record including the personal information for later retrieval or modification. The framework identity database shares the personal information with the application programs. The application programs can then utilize the personal information to customize a user's experience when interacting with the application programs, such as features, commands, documents, templates, wizards, lists, preferences, and other output used to interact with a user. The framework identity database is further operative to maintain, to retrieve, and to store one or more user records associated with one or more user identities. That is, when a user selects a particular user identity at a user interface, the user interface sends the selected user identity to the framework identity database. The framework identity database retrieves a user record including personal information associated with the selected user identity. The personal information is then shared with the application programs to customize a user's experience when interacting with the application programs.

26 Claims, 10 Drawing Sheets

U.S. PATENT DOCUMENTS

2002/0188736 A1* 12/2002 Jarvensivu .................. 709/229
2003/0120496 A1*  6/2003 Alfred et al. .................. 705/1
2004/0015886 A1*  1/2004 Aaltonen et al. ........... 717/134
2004/0031030 A1*  2/2004 Kidder et al. ............... 717/172
2005/0038876 A1*  2/2005 Chaudhuri .................. 709/219
2005/0198247 A1*  9/2005 Perry et al. .................. 709/223

* cited by examiner

SYSTEM AND METHOD FOR UTILIZING PERSONAL INFORMATION TO CUSTOMIZE AN APPLICATION PROGRAM

TECHNICAL FIELD

The present invention relates to a system and method for utilizing personal information to customize a user's experience, and more particularly relates to a system and method for utilizing personal information to customize a user's experience when interacting with an application program.

BACKGROUND OF THE INVENTION

Computers are being used at home, in the workplace, in our automobiles, and in every place imaginable. Computers have become so universal that someday every person may have their own computer. Even if several users share a single computer, software application programs executed by the computer will be shared among the several users.

In many instances, features or output offered by application programs can be customized. A user can change features or output by changing user preferences associated with the application program. Typically, these user preferences can be stored for future use by the application program. The application program can then customize features or output of the application program in accordance with the user's input to the user preferences. However, when a single application program is used by multiple users, each user may have a different preference for a particular customized feature. The next time the application program is operated, the application program applies the stored user preferences without regard to whether the initial user is using the program. Changing the stored user preferences for the application program each time a different user operates the application program can be very time consuming and very frustrating for the user.

In other instances, when a user enters user preferences for one application program, the user preferences are only applied for that particular application program. When a user operates several application programs executing on the same computer, user preferences from one particular application program can be shared among the other application programs. However, the user is forced to log out a previous user and log themselves in, in order for the particular user's preferences to be shared among application programs. Therefore, updating or changing the user preferences for all of the application programs when a particular user interacts with all of the application programs, can be very time consuming and frustrating for the user.

Therefore, there is a need for a system and method for utilizing personal information to customize a user's experience when interacting with an application program. Further, there is a need for a system and method for automatically updating or changing user preferences in one or more application programs being operated by one or more users.

SUMMARY OF THE INVENTION

The present invention solves the problems of the prior art by providing a system and method for utilizing personal information to customize a user's experience when interacting with an application program. Furthermore, the present invention provides a system and method for automatically changing user preferences in one or more application programs being operated by one or more users.

Generally described, the present invention is comprised of a framework identity database. The framework identity database is operative to share and to communicate personal information with one or more application programs. Typically, a user interacts with one or more application programs through an associated user interface. When the user enters personal information into the user interface, an associated application program sends the personal information to the framework identity database. The framework identity database receives the personal information, and creates a user record for the personal information. Furthermore, new or previously stored personal information can also be received from one or more application programs or input devices associated with a computer or network. Ultimately, the user record stores the personal information for future use. For each user's personal information, a unique user record can be created. Furthermore, a single user can have multiple user records corresponding to multiple user identities. Alternatively, multiple users can have one or more user records corresponding to one or more user identities. The framework database can retrieve, modify, and share user records including the personal information with one or more application programs. The personal information stored in the user records can then be used to customize output from one or more application programs, such as features, commands, documents, templates, and other similar output.

More particularly described, the framework identity database shares personal information with one or more associated application programs to customize the user's experience when interacting with the application programs. When a user operates an application program associated with the framework identity database for the first time, the user enters personal information through a user interface. Furthermore, new or previously stored personal information can also be received from one or more application programs or input devices associated with a computer or network. Typically, the personal information is unique to the user's identity. For example, an application program such as an electronic mail application program can present a user with a graphical user interface to enter personal information. When the user provides personal information, the application program sends the personal information to the framework identity database.

The framework identity database receives the personal information from the application program. The framework identity database stores the personal information in a user record unique to the user's identity. Therefore, for each unique user identity, the framework identity database creates a corresponding unique user record including personal information about that particular user. The framework identity database communicates with one or more associated application programs to share user records and personal information with the application programs.

Through a user interface, a user can select a particular user identity associated with personal information stored in a user record. For example, a graphical user interface for an application program can provide an identity list for a user to select a particular user identity. When the user selects a specific user identity, the application program sends a signal to or calls to the framework identity database to retrieve a particular user record corresponding to the selected user identity. The framework identity database locates the corresponding user record for the selected user identity. Typically, the user record is associated with a unique user's personal information. The framework identity database sends the corresponding user record to one or more application programs. When the application programs receive the user record containing personal information, the application programs can utilize the personal information to customize output such as features, commands, templates, documents, calendars, reminders, notes, or other characteristics or output of the application programs.

In another aspect of the present invention, a single user can establish one or more unique user identities, or alternatively, multiple users can establish one or more unique user identities for each respective user. In any case, the framework identity database creates a user record for each user and for each user's identity. A user may desire to have more than one user identity depending upon the user's environment or user's choice. For example, a user may want different information associated with his or her user identity when he or she is at work rather than at home. Thus, a user can have a separate work identity and a separate home identity, wherein each user identity can be associated with different personal information and each user identity is stored in a unique user record.

In yet another aspect of the present invention, personal information can also be shared by the framework identity database with a user preferences file associated with a shared code library. The shared code library can share the user preferences file with one or more associated application programs. Personal information can include a user's name, address, electronic mail address, telephone numbers, preference information, or other information that can be used to customize a user's experience when interacting with an application program.

In another aspect of the present invention, other types of user interfaces can be used to identify the user or to present a selection of identities to the user. For example, user interfaces can include, but are not limited to, a mouse, a keyboard, a touch-sensitive display screen, or a voice recognition interface. Typically, a user interface can send a command to or call to the framework identity database using the user's identity or the user's identity selection. The user's identity or identity selection is then used by the framework database to retrieve or to locate a corresponding user record.

In yet another aspect of the present invention, application programs can include, but are not limited to, word processors, electronic spreadsheets, graphical presentation programs, personal information managers, and electronic mail programs.

Yet another aspect of the present invention includes the sharing of personal information via a distributed network of computers such as the Internet. The framework identity database may share user records including personal information with a client or server executing one or application programs. The personal information may then be used to customize a user's experience when working through a network with one or more application programs executing on the client or server.

The various aspects of the present invention may be more clearly understood and appreciated from a review of the following detailed description of the disclosed embodiments and by reference to the drawings and claims.

DETAILED DESCRIPTION OF EMBODIMENTS

The present invention is a system and method for utilizing personal information to customize a user's experience when interacting with an application program. Furthermore, the present invention is also a system and method for automatically changing user preferences in one or more application programs being operated by one or more users. The present invention includes a framework identity database for receiving, storing, and sharing a user's personal information with one or more associated application programs. The framework identity database can operate in conjunction with a user interface and one or more associated application programs to receive a user's personal information. The user interface sends the personal information to the framework identity database. New or previously stored personal information can be utilized by the framework identity database. The framework identity database creates and stores a user record including the personal information for later retrieval or modification. The framework identity database shares the personal information with the application programs. The application programs can then utilize the personal information to customize a user's experience when interacting with the application programs, such as features, commands, documents, templates, wizards, lists, preferences, and other output used to interact with a user.

The framework identity database is further operative to maintain, to retrieve, and to store one or more user records associated with one or more user identities. That is, when a user selects a particular user identity at a user interface, the user interface sends the selected user identity to the framework identity database. The framework identity database retrieves a user record including personal information associated with the selected user identity. The personal information is then shared with one or more application programs to customize a user's experience when interacting with the application programs. The application programs can then utilize the personal information to customize a user's experience with respect to the selected user identity.

Figure 1:
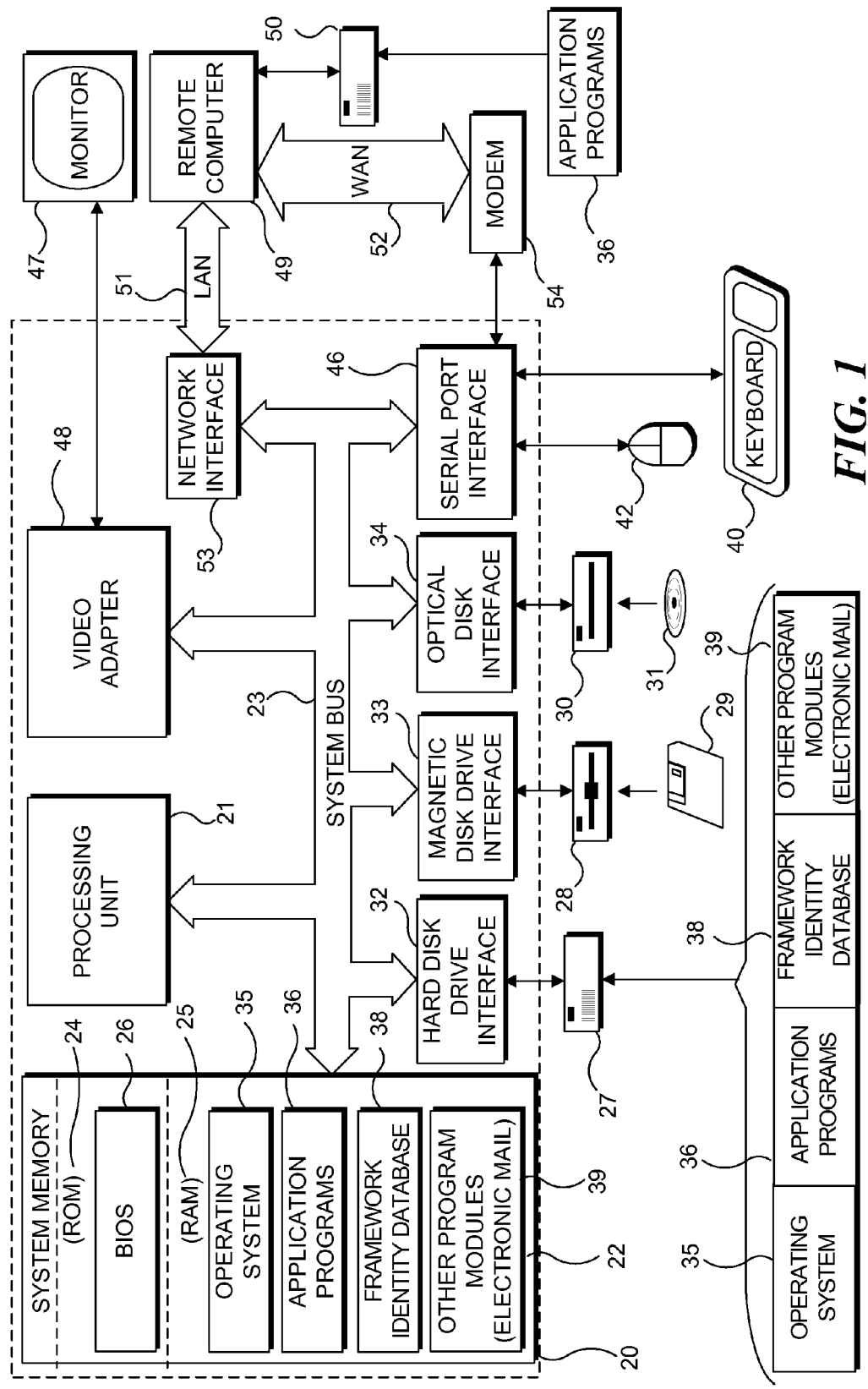
FIG. 1 is a block diagram of a computer system that provides the operating environment for an embodiment of the present invention.

FIG. 1 and the following discussion are intended to provide a brief, general description of a suitable computing environment in which the invention may be implemented.

While the invention will be described in the general context of an application program that runs on an operating system in conjunction with a personal computer, those skilled in the art will recognize that the invention also may be implemented in combination with other program modules. Generally, program modules include routines, programs, components, data structures, etc. that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

With reference to FIG. 1, a system for implementing the invention includes a conventional personal computer 20, including a processing unit 21, a system memory 22, and a system bus 23 that couples the system memory to the processing unit 21. The system memory 22 includes read only memory (ROM) 24 and random access memory (RAM) 25. A basic input/output system 26 (BIOS), containing the basic routines that help to transfer information between elements within the personal computer 20, such as during start-up, is stored in ROM 24. The personal computer 20 further includes a hard disk drive 27, a magnetic disk drive 28, e.g., to read from or write to a removable disk 29, and an optical disk drive 30, e.g., for reading a CD-ROM disk 31 or to read from or write to other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide nonvolatile storage for the personal computer 20. Although the description of computer-readable media above refers to a hard disk, a removable magnetic disk and a CD-ROM disk, it should be appreciated by those skilled in the art that other types of media which are readable by a computer, such as magnetic cassettes, flash memory cards, digital video disks, Bernoulli cartridges, and the like, may also be used in the operating environment.

A number of program modules may be stored in the drives and RAM 25, including an operating system 35, one or more application programs 36, and a framework identity database 38. The application programs can be a word processor, an electronic spreadsheet, a graphics presentation program, or an electronic mail program 39. A user may enter commands and information into the personal computer 20 through a keyboard 40 and pointing device, such as a mouse 42. Other input devices (not shown) may include a microphone, joystick, game pad, satellite dish, scanner, smartcards, identity scanners, automatic teller machines, or the like. These and other input devices are often connected to the processing unit 21 through a serial port interface 46 that is coupled to the system bus, but may be connected by other interfaces, such as a game port or a universal serial bus (USB). A monitor 47 or other type of display device is also connected to the system bus 23 via an interface, such as a video adapter 48. In addition to the monitor, personal computers typically include other peripheral output devices (not shown), such as speakers or printers.

The personal computer 20 may operate in a networked environment using logical connections to one or more remote computers, such as a remote computer 49. The remote computer 49 may be a server, a router, a peer device or other common network node, and typically includes many or all of the elements described relative to the personal computer 20, although only a memory storage device 50 has been illustrated in FIG. 1. The memory storage device 50 may include stored program modules that are executable by the remote computer 49. The logical connections depicted in FIG. 1 include a local area network (LAN) 51 and a wide area network (WAN) 52. Such networking environments are commonplace in offices, enterprise-wide computer networks, intranets and the Internet.

When used in a LAN networking environment, the personal computer 20 is connected to the LAN 51 through a network interface 53. When used in a WAN networking environment, the personal computer 20 typically includes a modem 54 or other means for establishing communications over the WAN 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are and other means of establishing a communications link between the computers may be used.

An embodiment of the present invention is represented by a framework identity database operating in conjunction with application programs including the "MICROSOFT WORD" word processing application program, the "MICROSOFT EXCEL" spreadsheet application program, the "MICROSOFT POWERPOINT" graphical presentation application program, and the "MICROSOFT ENTOURAGE" electronic mail application program. However, it should be understood that the present invention can be implemented by various program modules and/or application programs for use with various operating systems.

Figure 2:
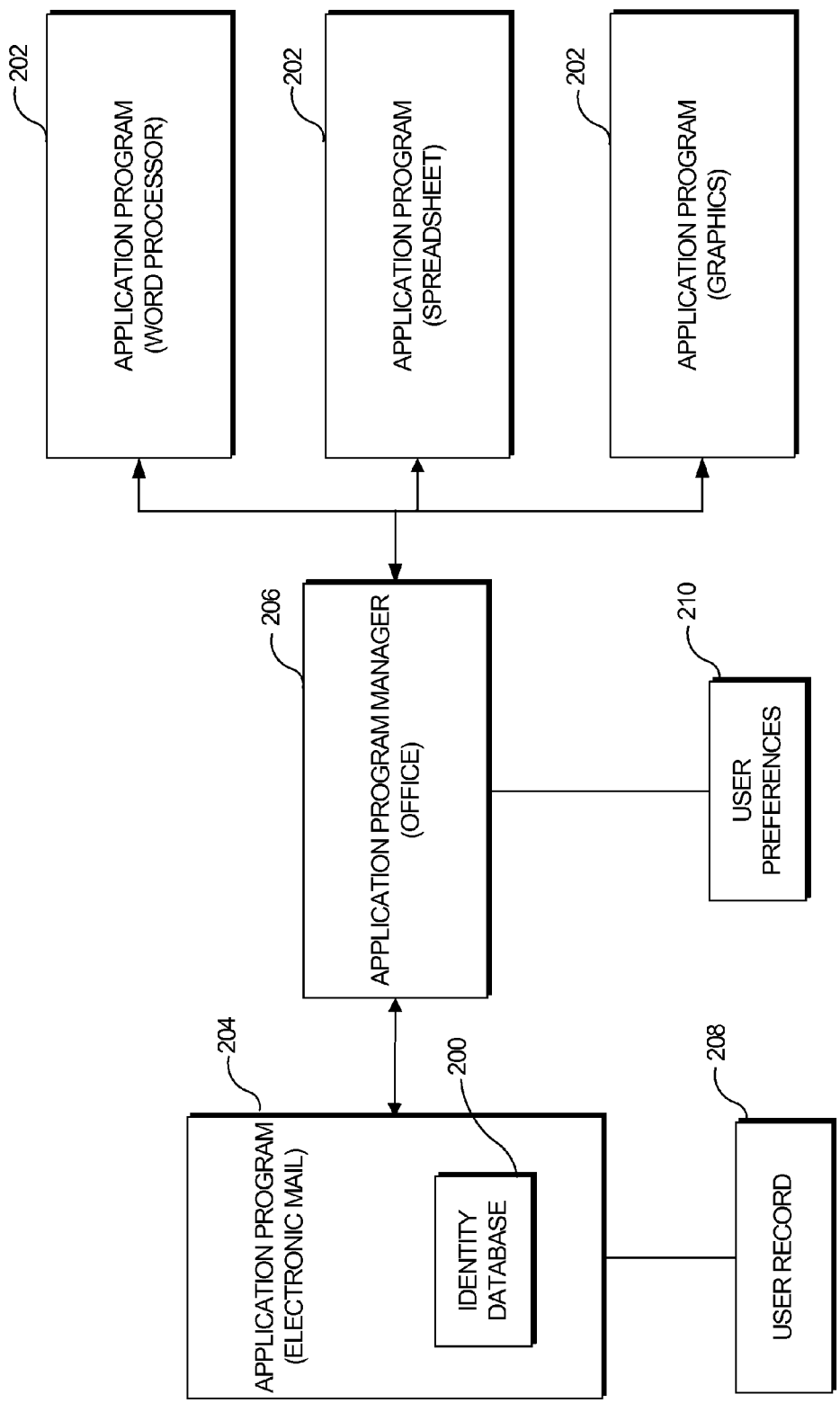
FIG. 2 is a block diagram depicting the interaction between a framework identity database and one or more application programs in an embodiment of the present invention.

Turning now to FIG. 2, the primary components of an embodiment of the present invention are depicted in block diagram format. FIG. 2 depicts an embodiment of a framework identity database 200 associated with one or more application programs 202.

The framework identity database 200 communicates with one or more application programs 202. The framework identity database 200 can also be associated with an application program such as an electronic mail application program 204. Typically, an application program such as an electronic mail application program 204 can communicate directly with the framework identity database 200. Other application programs 202 can communicate with the framework identity database 200 through a shared code library 206.

A user can enter personal information using a keyboard 40 through a user interface (not shown) associated with an application program 202, 204. The application program 202, 204 sends the information to the framework identity database 200, either directly or through the shared code library 206. Existing personal information previously collected by an application program or an input device can also be sent to the framework identity database 200, either directly or through the shared code library. When the framework identity database 200 receives the new or previously existing personal information, the framework identity database 200 creates a user record 208 corresponding to the user's personal information. Each user record 208 corresponds to a unique user identity. That is, a user record is created for each set of a user's personal information. Therefore, a single user can create multiple identities, multiple users can each have their own unique user identities, or multiple users can each have multiple user identities. In any case, a single user identity is associated with each user record 208.

The user records 208 can be stored internally or externally by the framework identity database 200 for retrieval and modification. The user record 208 can also be a conventional file configured to store personal information such as a user's first name, last name, suffix, nickname, company name, job position, company department, telephone numbers, addresses, pictures, and other personalized information. The framework identity database 200 can then track the location of each user record 208 for retrieval and modification.

When an application program 202, 204 calls to the framework identity database 200 for a specific user record 208, the framework identity database 200 can retrieve the user record 208 and send the personal information to the application programs 202, 204. Each application program 202, 204 can then utilize the user record 208 including the personal information to customize features, commands, templates, and documents associated with each application program 202, 204. For example, each application program 202, 204 can utilize a user record 208 to change the personal information contained in a user preferences file 210 associated with each application program 202, 204.

Furthermore, when a user modifies his or her personal information through the user interface 208, the application program 202, 204 calls to the framework identity database 200 for the unique user record 208 corresponding to the specific user's identity. The framework identity database 200 modifies the personal information associated with the user record 208 to correspond with the user's changes. The user's modified personal information is then stored in the user record 208 for retrieval or further modification.

In addition, the framework identity database 200 can send personal information from a user record 208 to a user preference file 210 or folder. The user preference file 210 stores user preferences with respect to features of one or more application programs 202. Typically, a shared code library 206 such as a dynamic link library (DLL) can store the user preference file 210 so that user preferences can be shared with one or more application programs 202.

Thus, personal information received from the framework identity database 200 can be shared among one or more application programs on a computer or in a network of computers. The personal information can be utilized by one or more application programs to customize a user's experience by implementing features that are based upon specific variables of the user, i.e. age, experience with computers, preferred language, etc. Therefore, a user's experience can be customized based upon his or her personal characteristics wherein the customization is reflected by a unique user interface for the particular user.

Figure 3:
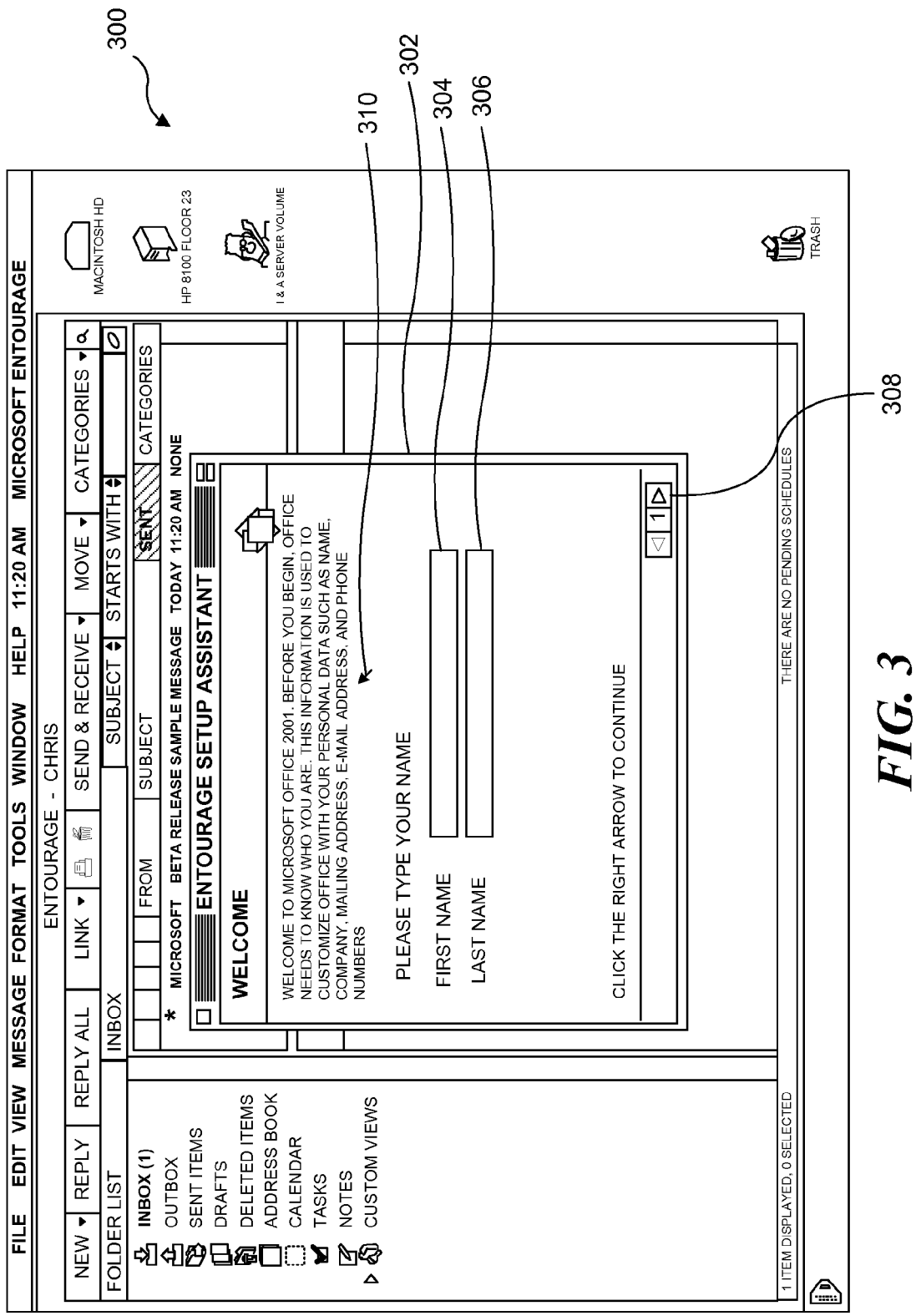
FIG. 3 is a graphical depiction of a user interface of an application program in an embodiment of the present invention.

Turning now to FIG. 3, a user interface 300 for entering personal information is depicted. Typically, the user interface 300 is associated with an application program 202 such as an electronic mail application program 204. When a user first operates the electronic mail application program 204 or other application program, the user interface 300 presents the user with a window 302 that includes one or more fields 304, 306 or another type of input interface for the user to enter personal information. For example, the user interface 300 can present two fields 304, 306 for the user to enter his or her first and last name. Additional pages or windows for entering personal information can be further accessed by the user. For example, a right-hand arrow 308 permits a user to access another page or window by moving a pointer 310 onto the arrow 308, and clicking the mouse 42 or other input device when the pointer 310 is on top of the arrow 308. Other types of user interfaces for entering personal information can include, but are not limited to, a dialog box, command or radio buttons, text input windows or fields for entering information, voice recognition, or other interfaces for receiving and entering personal information into an application program.

Moreover, a user interface is not necessary for entering personal information. New or previously existing personal information can be collected by one or more application programs or input devices associated with a computer or a network, and then sent to the framework identity database 200. Note that the user interfaces shown and described in this specification are for reference only and are not intended to limit the numerous methods of entering new or previously existing personal information to the framework identity database 200.

Figure 4:
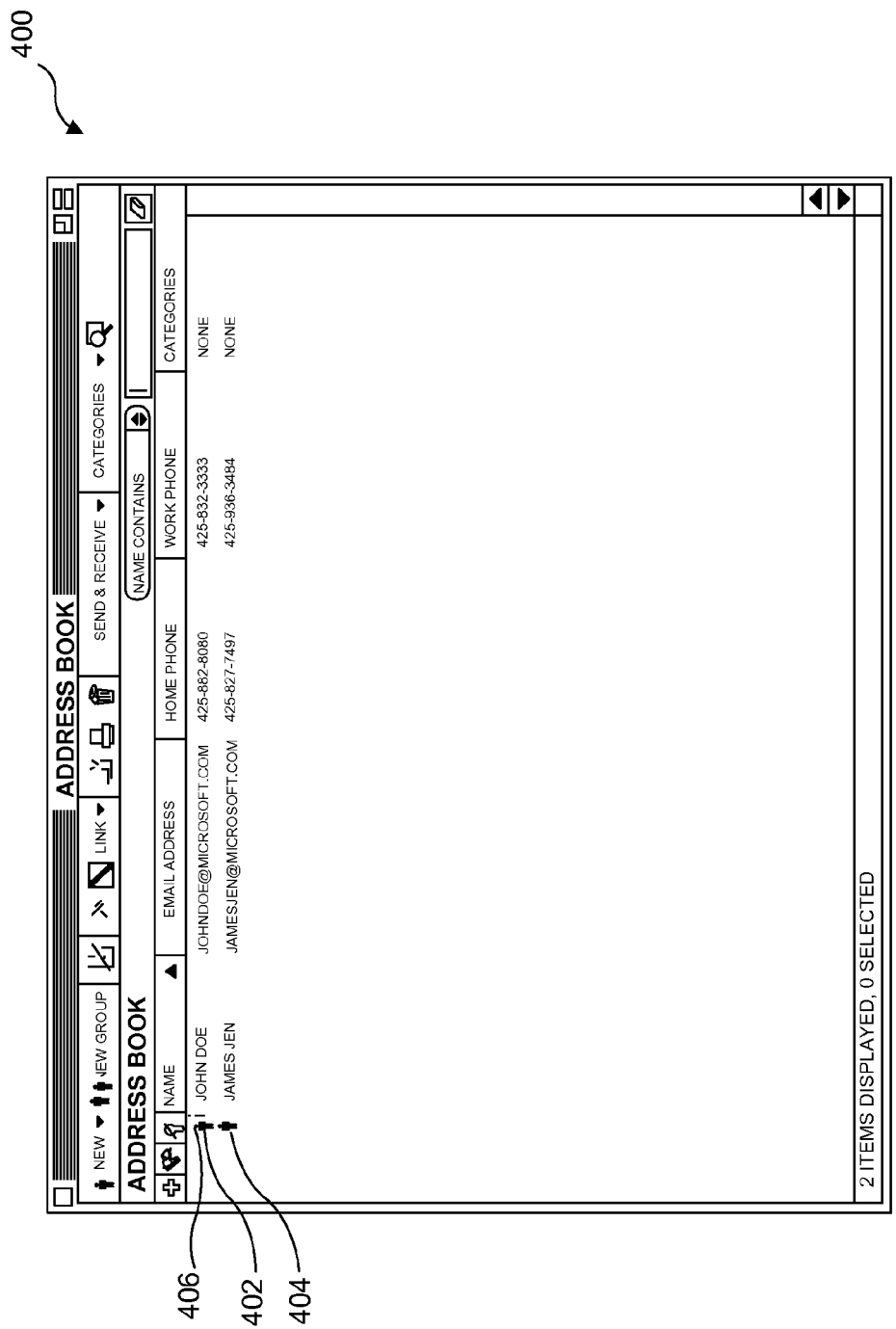
FIG. 4 is a graphical depiction of a user interface of an application program in an embodiment of the present invention.

FIG. 4 illustrates another user interface 400 for designating a specific user identity. Typically, when a user completes his or her initial entry of personal information through a keyboard 40 into a user interface such as that previously described in FIG. 3 as 300, the framework identity database 200 can then display another user interface 400 to permit the user to select a user identity corresponding with his or her personal information stored in a unique user record, shown in FIG. 2 as 208. For example, the user interface 400 is associated with an application program 202 such as an electronic mail application program 204. The user interface 400 can include one or more identity selections 402, 404 for one or more corresponding users. Multiple users can enter or select a particular identity selection 402, 404 at the user interface 400. Each particular identity selection 402, 404 can correspond to a different set of personal information unique to that particular user, such as a personal database of personal information or a personal database with an address book of contacts associated with the user. In this respect, all personal information, including an address book, mail account settings, preferences, etc., will change to correspond to the selected identity.

Alternatively, each user can have one or more identity selections 402, 404 corresponding to a different set of personal information such as a work profile, home profile, or school profile. Each profile can be a set of personal information that the user has entered or identified as preference information for a particular user identity. For example, a user can select a contact in an address book and set the contact to correspond with the user, i.e. "set the contact as me" or "me contact". This selection affects only the personal information associated with the user's identity.

In either case, each identity selection 402, 404 corresponds to a stored user record 208. In FIG. 4, the first identity selection 402 is an identity selection for a user named "John Doe", and the second identity selection 404 is an identity selection for a user named "James Jen". Selecting a particular user identity selection 402, 404 with a mouse 42 or keyboard 40, or other input device sends a signal or a command from the user interface 400 to the application program 202, 204. The signal or command can indicate the user's identity selection 402 to the framework identity database 200. When the framework identity database 200 receives the signal or command from the application program 202, 204, the framework identity database 200 retrieves a user record 208 including personal information that corresponds to the user's identity selection 402.

When the user designates a particular identity, the user's designation of a particular identity is identified by an "i" character 406 adjacent to the selected identity selection 402. The "i" character 406 permits the user to identify which identity selection 402, 404 has been selected. Depending upon the selected or designated identity selection 402, the framework identity database 200 can retrieve a user record 208 corresponding to the selected or designated identity selection 402. Personal information stored with the user record 208 can be used by the framework identity database 200 to customize the user's experience with one or more application programs 202, 204. In this case, a user's selection of a particular identity selection 402 only changes the personal information associated with the user's identity, that is, the "i" character corresponds with the user's selection of a "me" contact.

Other implementations of an "i" character can be made. This representation is by way of example only, and is not intended to limit the concept of permitting a user to designate a particular identity.

Figure 5:
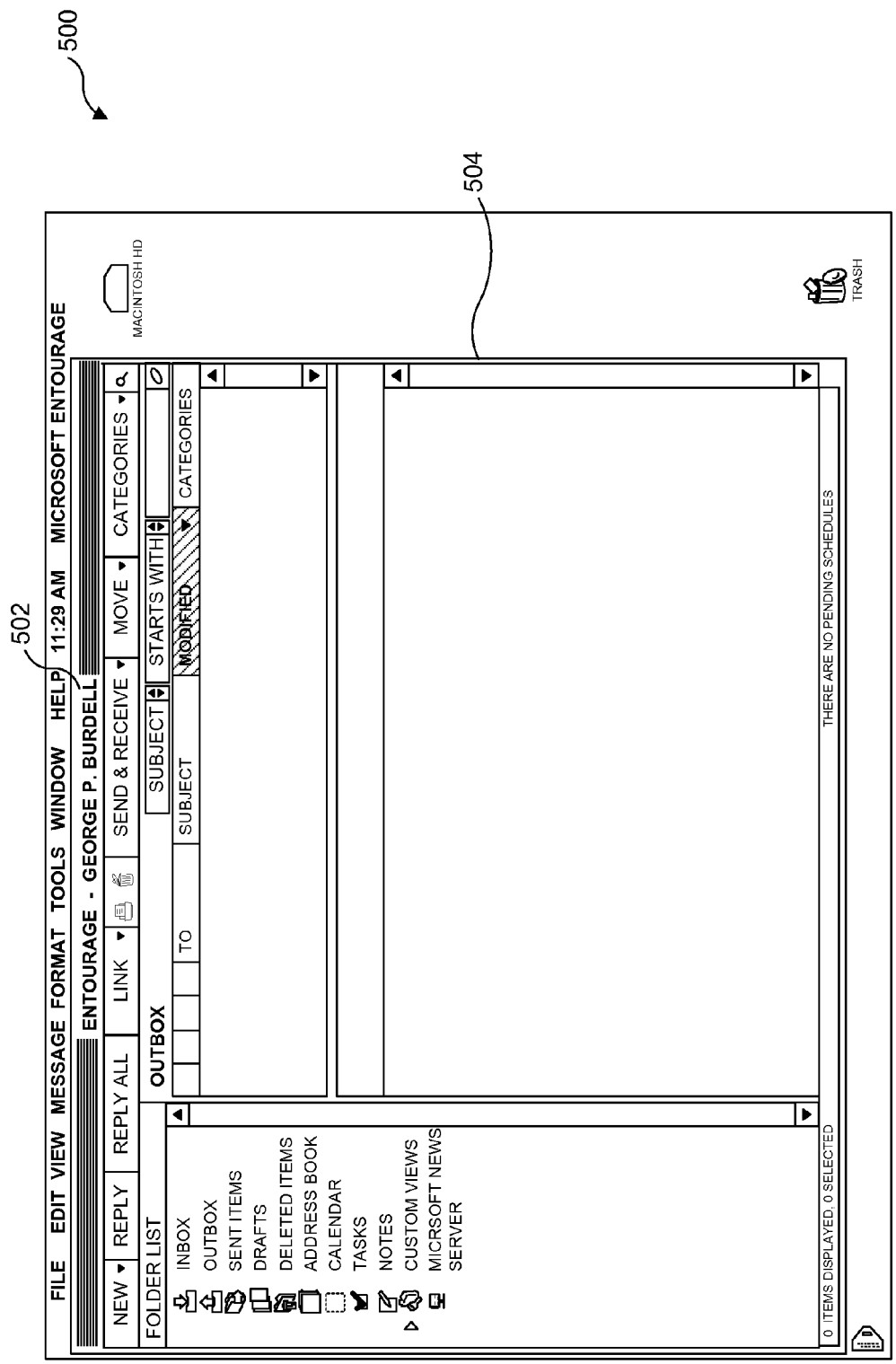
FIG. 5 is a graphical depiction of a user interface of an application program in an embodiment of the present invention.

FIG. 5 illustrates another user interface 500 associated with an application program 202 such as an electronic mail application program 204. This user interface 500 illustrates the use of personal information 502 in a window 504 associated with the electronic mail application program 204. For example, if a user named "George P. Burdell" entered personal information such as his name through the user interface shown in FIG. 3 as 300, and then selected or designated a corresponding identity selection named "George P. Burdell" to be that user's particular identity in the user interface 400 of FIG. 4, then the electronic mail application program 204 can display a user interface 500 that incorporates the user's particular identity. In this example, the user's personal information 502, such as his name "George P. Burdell", is used by the application program 204 at the top of the window 504.

Figure 6:
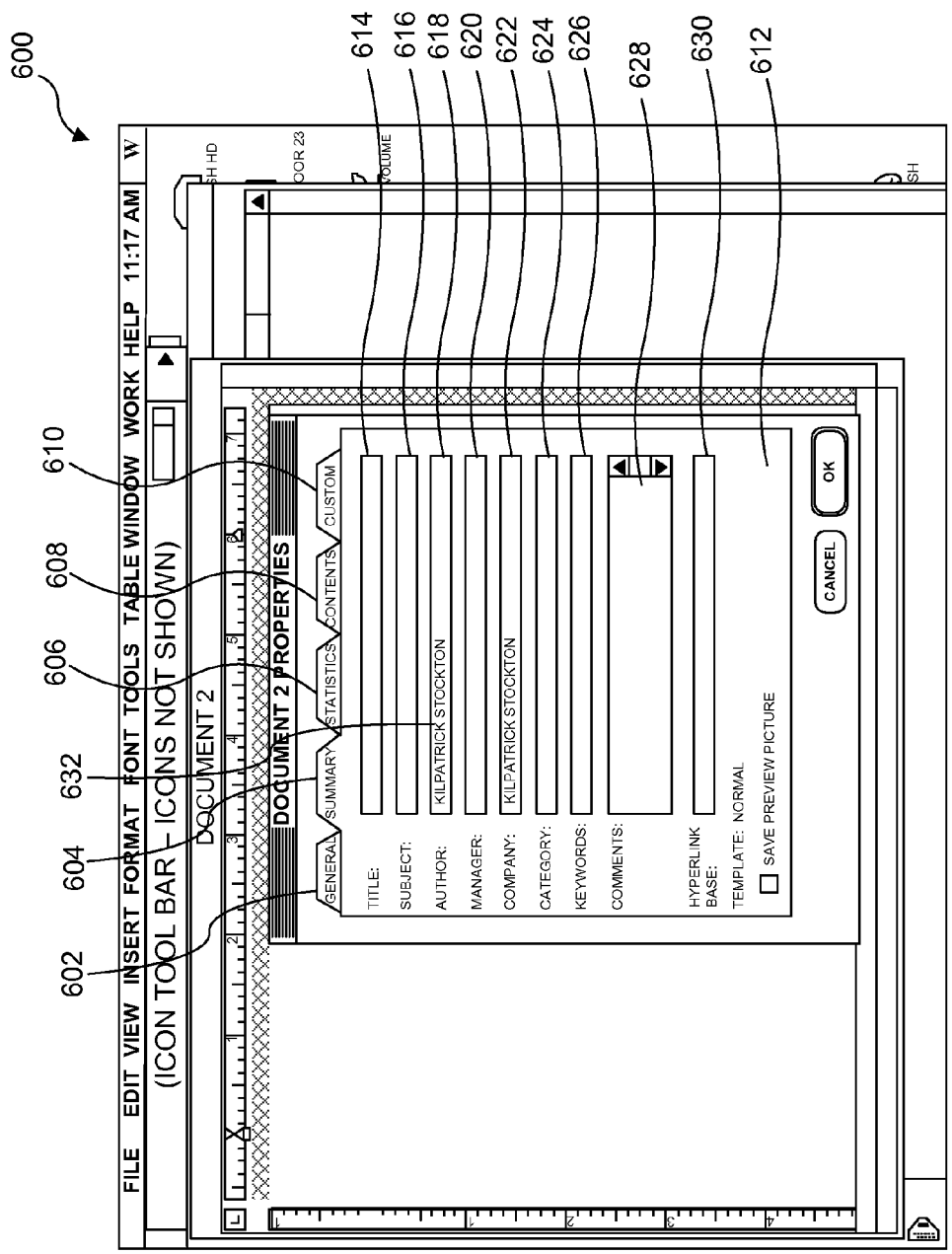
FIG. 6 is a method for utilizing personal information to customize a user's experience in an embodiment of the present invention.

FIG. 6 illustrates another user interface 600 associated with an application program 202 such as a word processing program. An application program 202 can utilize a user's personal information to customize output such as templates, documents, features, commands, wizards, and other output. For example, the user interface 600 includes one or more tabs 602–610 for a properties dialog box 612 or menu. Each tab 602–610 can contain one or more text fields 614–630 with a user's personal information 632 supplied by the framework identity database 200. Note that the author field 618 within the summary tab 604 is personal information 632 such as "Kilpatrick Stockton" that can be provided by entering personal information into a user interface as shown in FIG. 3 as 300.

By entering or altering personal information into one or more fields 614–630, a user can modify document properties associated with a user's personal information 632. When document property information is entered through the user interface 600, the framework identity database 200 can then modify document properties associated with the user's personal information stored with a user record 208 and associated with the user's identity selection 402, 404.

Figure 7:
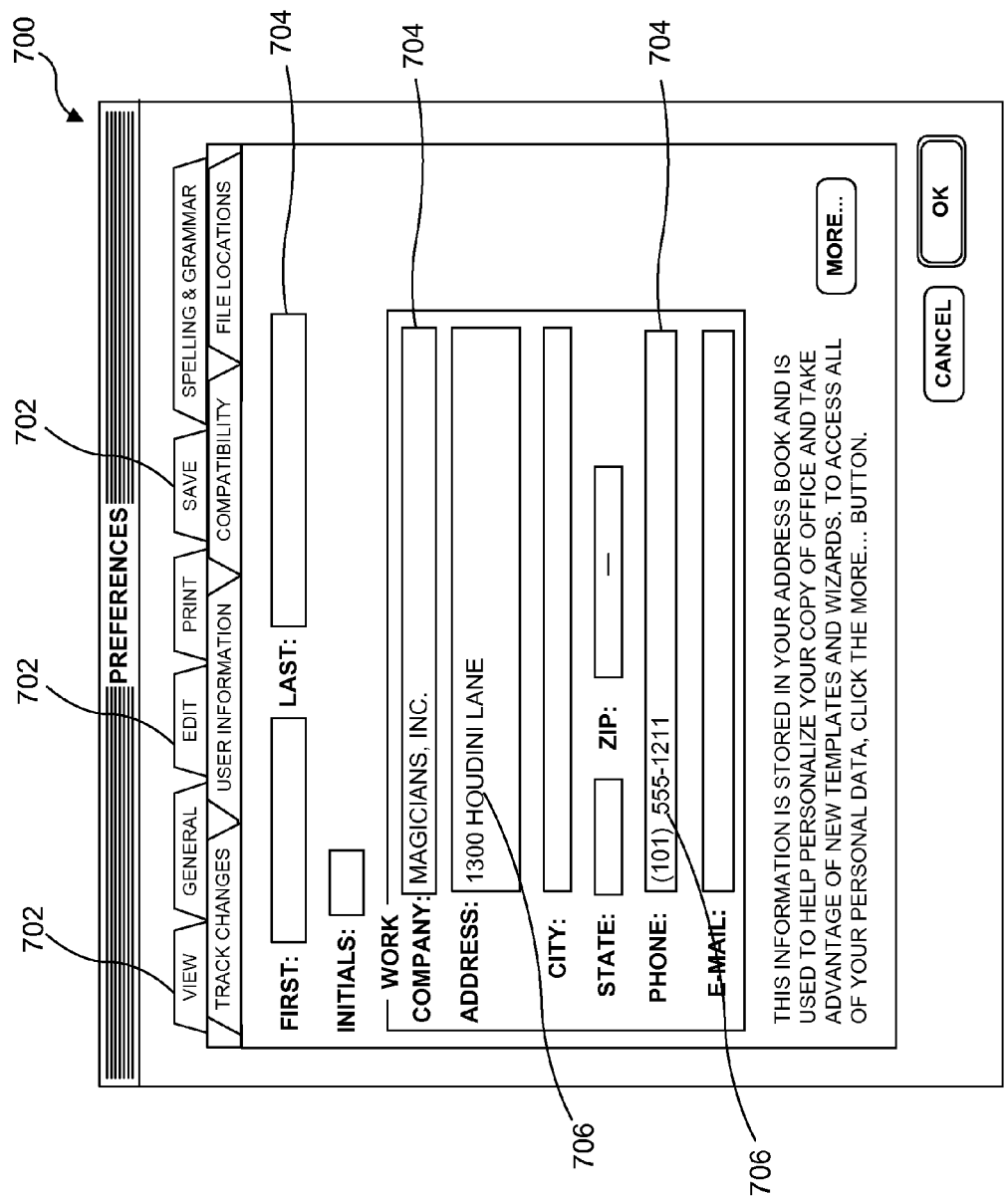
FIG. 7 is a second method for utilizing personal information to customize a user's experience in another embodiment of the present invention.

FIG. 7 illustrates another user interface 700 associated with an application program 202 such as a word processing program. The user interface can be a user preferences window. An application program 202 can utilize a user's personal information received from the framework identity database 200 to complete an application program's user preferences window. For example, a user preferences window can include one or more tabs 702, wherein each tab 702 can include one or more fields 704. A user's personal information 706 can be supplied by the framework identity database 200 or entered into the user interface by a user. If a user's personal information 706 is entered by a user into the user interface 700 shown, then the user interface can send the personal information through the application program 202 to the framework identity database 200. When the personal information 706 is received by the framework identity database 200, the framework identity database 200 can modify an existing user record 208 corresponding to the user's identity selection or create a new user record 208 using the new personal information.

Figure 8:
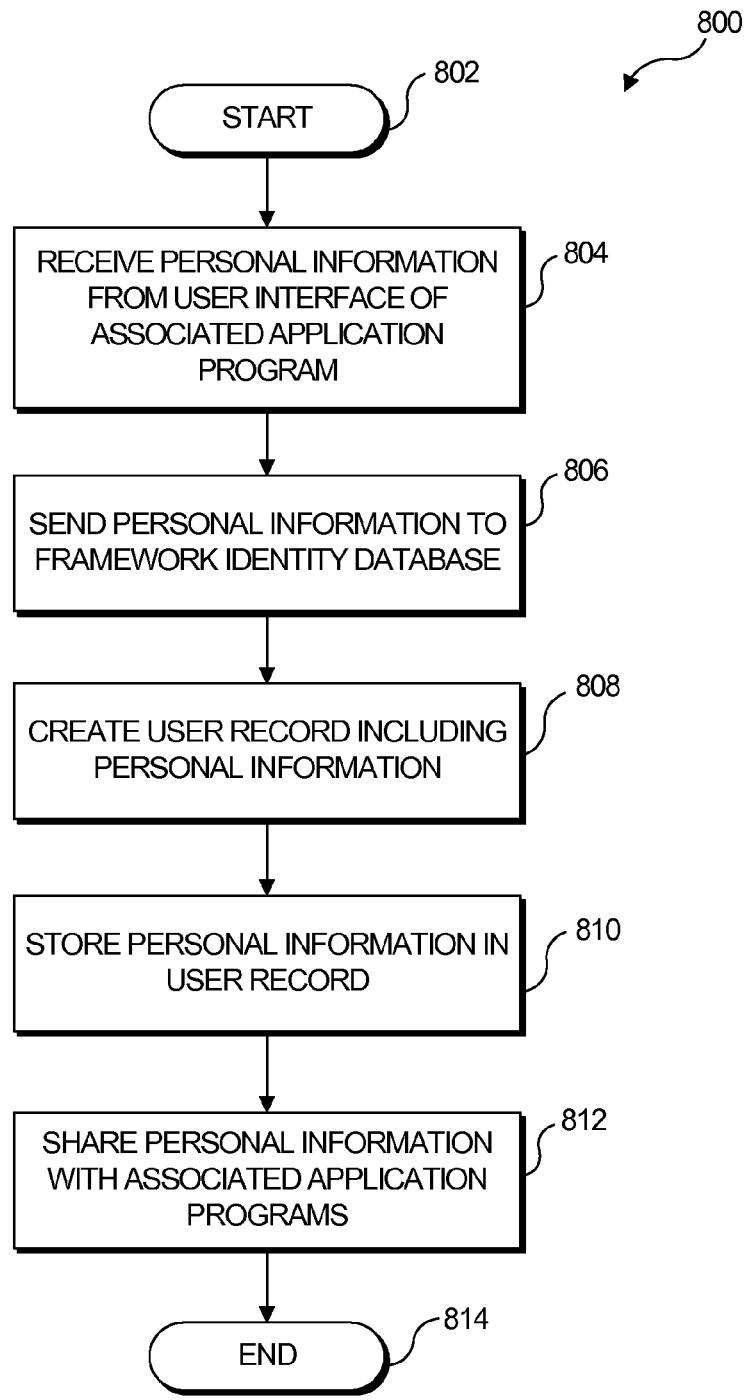
FIG. 8 is a third method for utilizing personal information to customize a user's experience in another embodiment of the present invention.

Turning now to FIG. 8, a flow chart depicts a method 800 for utilizing personal information to customize a user's experience when interacting with an application program. The method 800 starts at step 802.

Step 802 is followed by step 804, in which a user interface associated with an application program 202, 204 receives a user's personal information. As described in FIG. 2, a user can input or enter personal information with a keyboard 40, a mouse 42, voice recognition interface, or other input device through a user interface associated with one or more application programs 202, 204. Alternatively, if a user previously entered personal information into a user interface associated with a different application program than the user's current application program, the previously entered personal information can be utilized by the user interface when the user starts the current application program. Furthermore, new or previously stored information can be received by the application program from one or more application programs or input devices associated with a computer or through a network.

Step 804 is followed by step 806, in which the application program 202, 204 sends the personal information to a framework identity database 200. Alternatively, the application program can send the personal information through a shared code library 206 such as "MICROSOFT OFFICE" that is associated with one or more application programs 202, 204. The personal information is sent by the shared code library 206 to the framework identity database 200. In either case, the personal information is received by the framework identity database 200.

The method 800 then proceeds to step 808, in which the framework identity database 200 creates a user record 208 including the personal information. The framework identity database 200 uses conventional file formats to organize personal information into a usable format for file storage and retrieval.

Step 808 is followed by step 810, in which the framework identity database 200 stores the user record 208. A user record can be stored internally or externally by the framework identity database 200. The user record 208 including personal information can be retrieved and modified at a later time. For example, the user record 208 can be a conventional file for storing personal information for retrieval and modification.

Step 808 is followed by step 810, in which the framework identity database 200 shares a user record 208 including personal information with one or more associated application programs 202, 204. The personal information can then be utilized by the application programs 202,204 to customize a user's experience when interacting with the application programs. Furthermore, the user record 208 can be shared with a user preference file 210 associated with a shared code library 206. Personal information from the user record 208 can be used by the user preference file 210 to customize a user's experience when interacting with the application programs.

Step 810 is followed by step 812, in which the method 800 ends.

Figure 9:
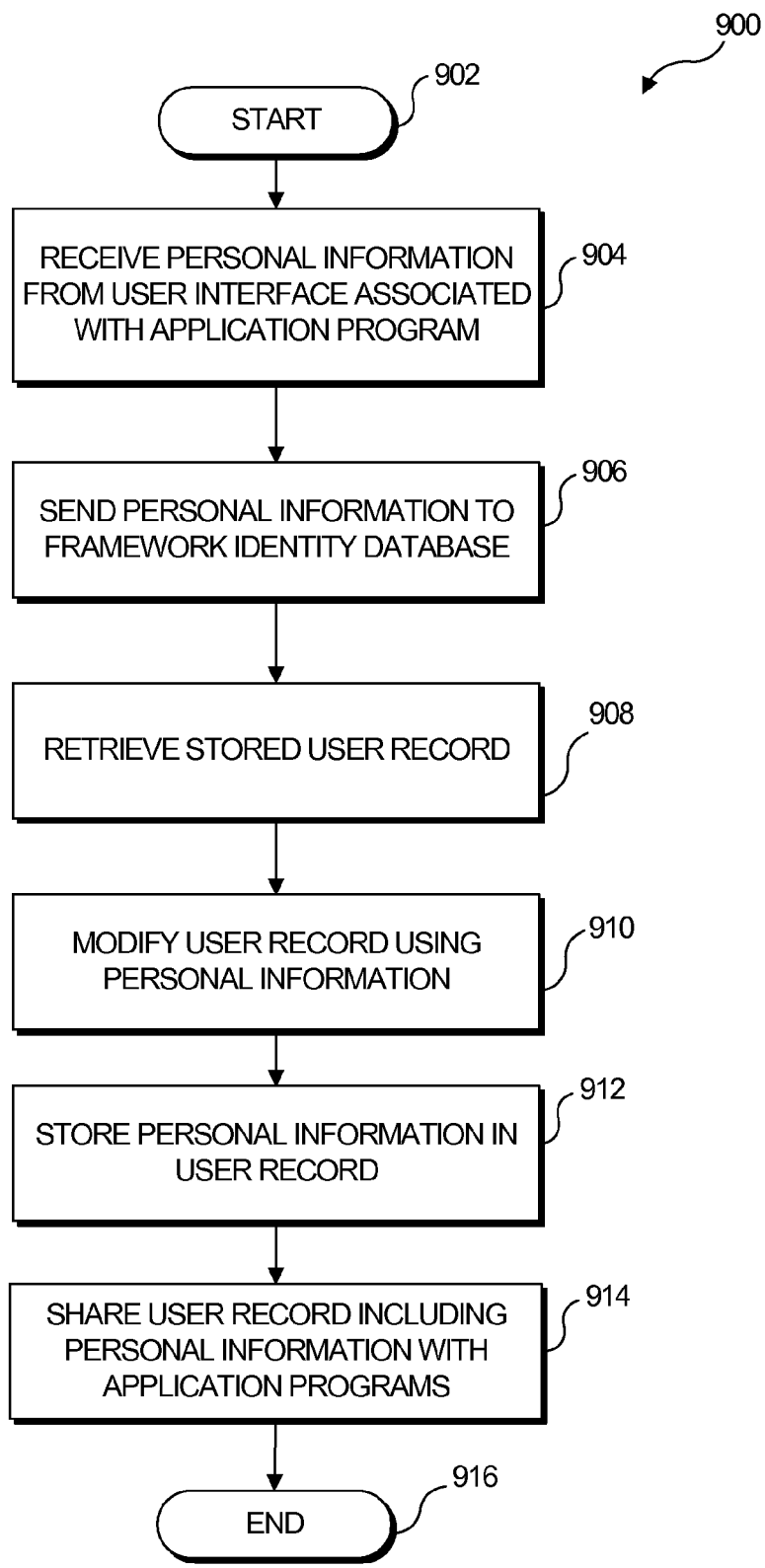
FIG. 9 is a flow chart depicting another method for utilizing personal information to customize a user's experience when interacting with an application program.

Referring now to FIG. 9, a flow chart depicts another method 900 for utilizing personal information to customize a user's experience when interacting with an application program in accordance with another embodiment of the present invention. The method 900 starts at step 902 and proceeds to step 904.

At step 904, a user interface 208 associated with an application program 202, 204 receives a user's personal information. As described in FIG. 2, a user can input or enter personal information with a keyboard 40, a mouse 42, or other input device through a user interface associated with one or more application programs 202, 204.

Typically, the user wants new or modified personal information to be utilized to customize the current application program or other application programs the user interacts with. The user interface receives new personal information when the user desires to enter new personal information or modify a previously stored user record by entering new personal information into the user interface. The user's new personal information corresponds to the user's current identity.

Note that all personal information does not have to be received by the user interface. New or previously stored information can be received by the application program from one or more application programs or input devices associated with a computer or through a network.

Step 904 is followed by step 906, in which the application program 202, 204 sends the new or modified personal information to the framework identity database 200. Alternatively, the application program can send the personal information to the framework identity database 200 through a shared code library 206 of one or more associated application programs. The personal information then sent by the shared code library 206 to the framework identity database 200. In either case, the personal information is received by the framework identity database 200.

The method 900 then proceeds to step 908, in which the framework identity database 200 retrieves a user record 208 corresponding to the user's selected or desired user identity. The user record 208 includes personal information previously stored by the framework identity database 200 and corresponds to a particular user identity.

Step 908 is followed by step 910, in which the framework identity database 200 modifies the user record 208 with the new personal information. Personal information received by the framework identity database 200 can be used to replace, modify, or supplement personal information already stored in the user record 208.

Step 910 is followed by step 912, in which the framework identity database 200 stores the new or modified personal information in the user record 208. Typically, the personal information can be stored in the user record 208 for later retrieval or modification.

Step 912 is followed by step 914, in which the framework identity database 200 shares the user record 208 including the new or modified personal information with one or more associated application programs 202, 204. The new personal information is sent by the framework identity database 200 to one or more application programs 202, 204, and can then be utilized by the application programs 202, 204 to customize a user's experience when interacting with the application programs 202, 204.

Furthermore, the user record 208 can be shared with a user preference file 210 associated with a shared code library 206. Personal information from the user record 208 can be used by the user preference file 210 to customize a user's experience when interacting with the application programs.

Step 914 is followed by step 916, in which the method 900 ends.

Figure 10:
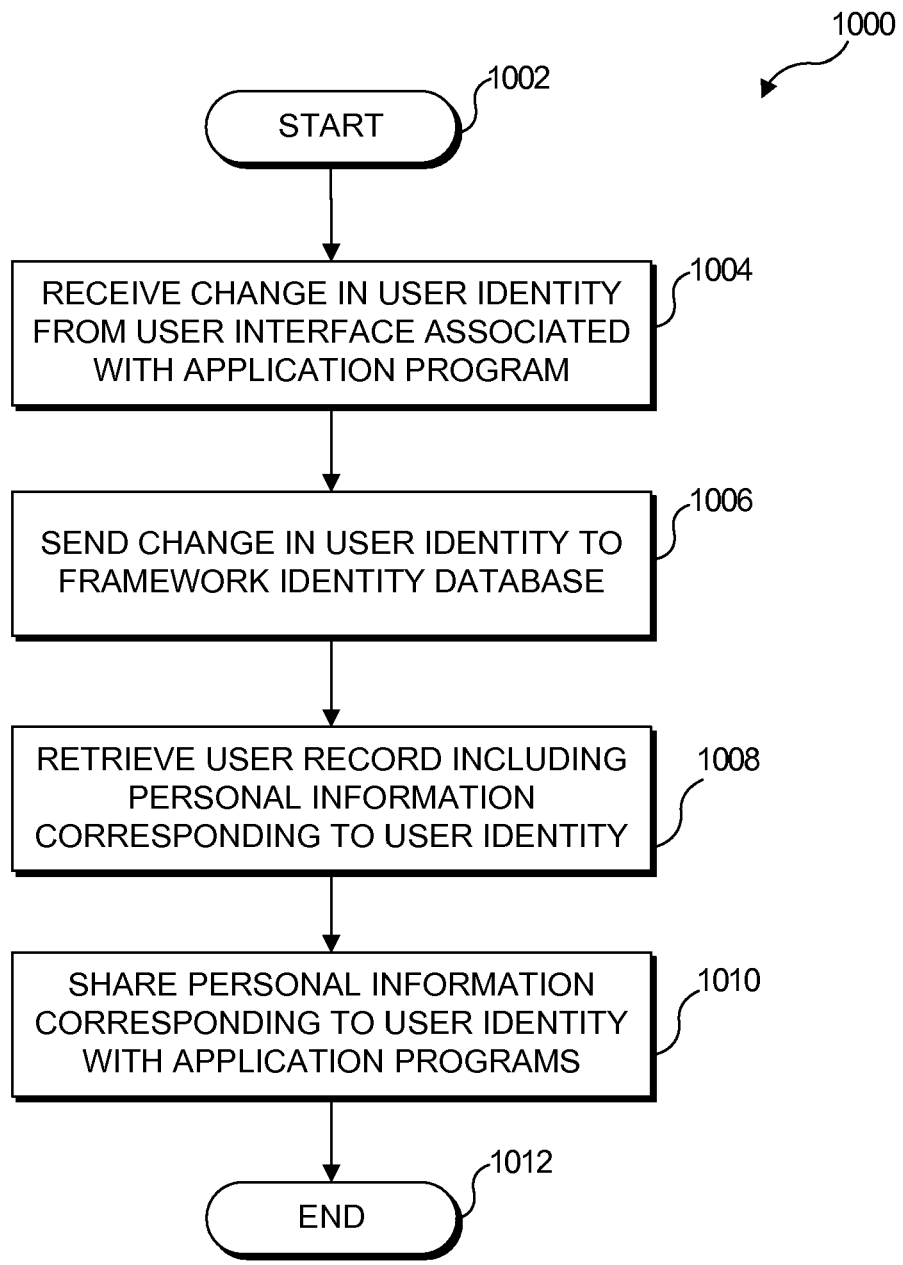
FIG. 10 is a flow chart depicting yet another method for utilizing personal information to customize a user's experience when interacting with an application program.

Turning now to FIG. 10, a flow chart 1000 depicts another method for utilizing personal information to customize a user's experience when interacting with an application program in accordance with another embodiment of the present invention. The method 1000 starts at step 1002.

Step 1002 is followed by step 1004, in which a user interface associated with an application program 202, 204 receives a user's identity selection, as previously described in connection with FIGS. 2 and 4. Typically, a user will want to select a previously existing user identity associated with previously stored personal information in a user record 208. The user can select a particular user identity from a list of user identities presented by a user interface, shown as 400 and described in FIG. 4.

Step 1004 is followed by step 1006, in which the application program 202, 204 sends the user's identity selection to the framework identity database 200. Alternatively, the application program 202, 204 can send the user's identity selection to a shared code library 206 for one or more associated application programs 202. The user's identity selection is then sent by the shared code library 206 to the framework identity database 200. In either case, the user's identity selection is received by the framework identity database 200.

The method then proceeds to step 1008, in which the framework identity database 200 retrieves a user record 208 corresponding to the user's identity selection. The user record 208 includes personal information corresponding to the user's identity selection that was previously stored by the framework identity database 200.

Step 1008 is followed by step 1010, in which the framework identity database 200 shares the user record 208 including the personal information corresponding with the user's identity selection with one or more application programs 202, 204. The personal information can then be utilized by the application programs 202, 204 to customize a user's experience when interacting with the application programs.

Furthermore, the user record 208 can be shared with a user preference file 210 associated with a shared code library 206. Personal information from the user record 208 can be used by the user preference file 210 to customize a user's experience when interacting with the application programs.

Step 1010 is followed by step 1012, in which the method 1000 ends.

The present invention has been described in relation to particular embodiments which are intended in all respects to be illustrative rather than restrictive. Alternative embodiments will become apparent to those skilled in the art to which the present invention pertains without departing from its spirit and scope. Accordingly, the scope of the present invention is defined by the appended claims rather than the foregoing description.

We claim:

1. A method for utilizing personal information to customize an application program, comprising the steps of:

receiving personal information from a user corresponding to a unique user identity, and sending the personal information to a shared code library including a plurality of application programs;

enabling communication between the shared code library and a framework identity database, wherein the shared code library provides the personal information to the framework identity database, and wherein the personal information includes at least one of the user's:
surname;
given name;
address;
set of initials;
telephone number; and
firm name;
creating a user record for each unique user identity including the personal information, and storing the user record in the framework identity database in which the user record can be shared with the plurality of application programs and wherein a single user can create multiple user records corresponding to a plurality of unique user identities;
storing multiple user records with personal information that corresponds to a the plurality of unique user identities, the personal information in each of the user records being accessible by the plurality of application programs because communication is enabled between the framework identity database and the shared code library; and
upon identifying the unique user identity applicable to execution of an application program that is included in the plurality of application programs, sharing the personal information corresponding with the unique user identity with the application program, wherein the personal information is applied to customize an output of the application program by including at least a portion of the personal information within the output of the application program.

2. The method of claim 1, further comprising the steps of:
in response to receiving new personal information corresponding to the unique user identity,
retrieving the user record including the personal information;
modifying the user record including the personal information with the new personal information; and
sharing the new personal information with the application program, wherein the new personal information is applied to the output of the application program.

3. The method of claim 1, further comprising the steps of:
in response to receiving new personal information corresponding to a new unique user identity,
creating a user record including the new personal information corresponding to the new unique user identity; and
sharing the new personal information corresponding to the new unique user identity with the application program, wherein the new personal information corresponding to the new unique user identity is applied to an the output of the application program.

4. The method of claim 3, further comprising the steps of:
in response to receiving a change in user identity,
retrieving the user record corresponding to the changed user identity; and
sharing personal information associated with the user record corresponding to the changed user identity with the application program, wherein the personal information associated with the user record corresponding to the changed user identity is applied to the output of the application program.

5. The method of claim 1, wherein the step of receiving personal information corresponding to the unique user identity further comprises the step of receiving the personal information through a user interface.

6. The method of claim 5, wherein the user interface comprises at least one of: a graphical user interface, a mouse, a keyboard, a touch-sensitive display screen, and a voice recognition interface.

7. The method of claim 1, wherein the step of receiving personal information corresponding to the unique user identity further comprises the step of receiving one of new and previously stored personal information from one of a computer and a network.

8. The method of claim 1, wherein the personal information comprises at least one of: a user name, an address, a telephone number, a picture, a speech pattern, a preference, and a list.

9. The method of claim 1, wherein the personal information comprises at least one of: a dictionary, an auto-correct list, a menu option, a dialog layout, a dictionary setting, a grammar setting, a help list, and a user preference list.

10. The method of claim 1, wherein the output comprises at least one of: a document, a template, a wizard, a command, a tab, a preference, and a feature.

11. The method of claim 1, wherein the application program comprises at least one of: a word processor, an electronic spreadsheet, a graphical presentation program, an electronic personal information manager, and an electronic mail program.

12. The method of claim 1, wherein the application program comprises a plurality of modules.

13. The method of claim 1, wherein the step of receiving personal information comprises the step of receiving personal information from a second application program.

14. A computer system for utilizing personal information to customize an application program comprising:
a memory for storing a plurality of application programs, machine instructions, a shared code library and a framework identity database; and
a processor functionally coupled to the memory, for executing the machine instructions and in response thereto, being operable for:
receiving personal information from a user corresponding to a unique user identity, and sending the personal information to a shared code library including the plurality of application programs, wherein the shared code library provides the personal information to the framework identity database, and wherein the personal information includes at least one of the user's:
surname;
given name;
address;
set of initials;
telephone number; and
firm name;
creating a user record for each unique user identity including the personal information, and storing the user record in the framework identity database in which the user record can be shared with the plurality of application programs and wherein a single user can create multiple user records corresponding to a plurality of unique user identities;
storing multiple user records with personal information that corresponds to the plurality of unique user identities, the personal information in each of the user records being accessible by a plurality of application programs because communication is enabled between the framework identity database and the shared code library; and upon identifying the unique user identity applicable to execution of an application program included in the plurality of application programs, sharing the personal information corresponding with the unique user identity with the application program, wherein the personal information is applied to customize an output of the application program by including at least a portion of the personal information within the output of the application program.

15. The computer system of claim 14, wherein the machine instructions further cause the processor to:
in response to receiving new personal information corresponding to the unique user identity,
retrieve the user record including the personal information;
modify the user record including the personal information with the new personal information; and
share the new personal information with the application program, wherein the new personal information is applied to the output of the application program.

16. The computer system of claim 14, wherein the machine instructions further cause the processor to:
in response to receiving new personal information corresponding to a new unique user identity,
create a user record including the new personal information corresponding to the new unique user identity; and
share the new personal information corresponding to the new unique user identity with the application program, wherein the new personal information corresponding to the new unique user identity is applied to the output of the application program.

17. The computer system of claim 16, wherein the machine instructions further cause the processor to:
in response to receiving a change in user identity,
retrieve the user record corresponding to the changed user identity; and
share personal information associated with the user record corresponding to the changed user identity with the application program, wherein the personal information associated with the user record corresponding to the changed user identity is applied to the output of the application program.

18. The computer system of claim 14, wherein the personal information corresponding to the unique user identity is received through a user interface.

19. The computer system of claim 14, wherein the personal information corresponding to the unique user identity is received as one of new and previously stored personal information from one of a computer and a network.

20. The computer system of claim 14, further comprising a user interface comprising at least one of: a graphical user interface, a mouse, a keyboard, a touch-sensitive display screen, and a voice recognition interface.

21. The computer system of claim 14, wherein the personal information comprises at least one of: a user name, an address, a telephone number, a picture, a speech pattern, a preference, and a list.

22. The computer system of claim 14, wherein the personal information comprises at least one of: a dictionary, an auto-correct list, a menu option, a dialog layout, a dictionary setting, a grammar setting, a help list, and a user preference list.

23. The computer system of claim 14, wherein the output comprises at least one of: a document, a template, a wizard, a command, a tab, a preference, and a feature.

24. The computer system of claim 14, wherein the application program comprises at least one of: a word processor, an electronic spreadsheet, a graphical presentation program, an electronic personal information manager, and an electronic mail program.

25. The computer system of claim 14, wherein the application program comprises a plurality of modules.

26. The computer system of claim 14, wherein personal information is received from a second application program.

* * * * *